(12) United States Patent
Trexler, Jr. et al.

(10) Patent No.: US 7,279,124 B2
(45) Date of Patent: Oct. 9, 2007

(54) NUCLEATION ENHANCED POLYESTER AND ITS USE IN MELT-TO-MOLD PROCESSING OF MOLDED ARTICLES

(75) Inventors: Jack Wesley Trexler, Jr., Kingsport, TN (US); David Scott Porter, Blountville, TN (US); James Christopher Scanlan, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 333 days.

(21) Appl. No.: 10/850,295

(22) Filed: May 20, 2004

(65) Prior Publication Data

US 2005/0261463 A1    Nov. 24, 2005

(51) Int. Cl.
*C08L 67/00* (2006.01)
*C08L 77/00* (2006.01)
*B28B 3/00* (2006.01)

(52) U.S. Cl. ............... 264/176.1; 264/239; 264/328.1; 264/345; 264/346; 524/514; 524/538; 525/166; 525/175; 525/176; 525/177; 525/425

(58) Field of Classification Search ............... 525/425, 525/176, 177, 175, 166; 524/514, 538; 264/345, 264/346, 176.1, 239, 328.1
See application file for complete search history.

(56) References Cited

U.S. PATENT DOCUMENTS

| | | | |
|---|---|---|---|
| 3,619,266 A | 11/1971 | Weissermel et al. | |
| 3,663,653 A | 5/1972 | Frohlich et al. | |
| 3,960,807 A | 6/1976 | McTagart | |
| 4,088,709 A | 5/1978 | Seymour et al. | |
| 4,322,335 A | 3/1982 | Nield | |
| 4,327,007 A | 4/1982 | Vanderkooi, Jr. et al. | |
| 4,357,268 A | 11/1982 | Vanderkooi, Jr. et al. | |
| 4,548,978 A | 10/1985 | Garrison, Jr. | |
| 4,551,485 A | 11/1985 | Ragan et al. | |
| 4,837,115 A | 6/1989 | Igarashi et al. | |
| 4,996,269 A | 2/1991 | Richeson et al. | |
| 5,102,943 A | 4/1992 | Logullo | |
| 5,258,233 A | 11/1993 | Mills et al. | |
| 5,340,884 A * | 8/1994 | Mills et al. | 525/420 |
| 5,389,710 A | 2/1995 | Dege et al. | |
| 5,405,921 A | 4/1995 | Muschiatti et al. | |
| 5,567,758 A | 10/1996 | Kinami et al. | |
| 5,650,469 A * | 7/1997 | Long et al. | 525/425 |

OTHER PUBLICATIONS

D. W. Van Krevelen—University of Technology, Delft, The Netherlands, "Crystallinity of Polymers and the Means to Influence the Crystallization Process", Chimia 32 (1978) Nr. 8 (August), pp. 279-294.

* cited by examiner

*Primary Examiner*—Ana Woodward
(74) *Attorney, Agent, or Firm*—Michael K. Carrier; Bernard J. Graves, Jr.

(57) ABSTRACT

Crystallizable polyester compositions containing an aliphatic polyamide crystallization nucleator exhibit controllable and adjustable crystallization rates upon cooling from the melt and are thermoformable in melt to mold processes.

25 Claims, No Drawings

NUCLEATION ENHANCED POLYESTER AND ITS USE IN MELT-TO-MOLD PROCESSING OF MOLDED ARTICLES

BACKGROUND OF THE INVENTION

1. Field of the Invention

The present invention is directed to melt-to-mold processes for preparation of molded articles of crystallizable polyester, to compositions suitable for use therein, and to molded articles produced thereby.

2. Background Art

Ovenable food trays of crystallizable polyester have become significant items of commerce. While food trays such as those employed in prepackaged meals can, in principle, be prepared from numerous polymers, it is desired that such trays be suitable both for use in conventional ovens and in microwave ovens ("dual ovenable"). In addition, at the temperature of the hot food, such trays must exhibit dimensional stability for acceptable handling. For these reasons, crystallizable polyesters are the predominant construction material due to their high melting point and excellent dimensional stability.

Two processes are in use for the thermoforming of food trays from crystalline polyester, and the physiochemical properties of the polyester compositions used in these processes are significantly different. In the first process, sometimes termed the "roll-fed" or "in line" process, as disclosed in U.S. Pat. No. 3,496,143, the thermoforming process both forms the shape of the tray and crystallizes the polyester, which is supplied as a vitrified (amorphous) film. Polyester obtained from the melt is amorphous, and development of significant crystallinity is necessary to obtain the desired physical properties. In this first process, amorphous polyester sheet (film) is heated, and then supplied to a heated mold, for example a mold formed between two heated platens. Crystallization is then accomplished by holding the polyester at a temperature between its glass transition temperature, $T_g$, and its crystalline melt temperature, $T_m$. Crystallization of the sheet in its net shape produces the desired high temperature stability of the thermoformed article, and allows its removal from the mold without damage. Thus, in this first process, the polyester is heated from below its glass transition temperature to a temperature range in which crystallization can occur.

The foregoing process requires preparation and storage of an amorphous polyester film. Unmodified, crystallizable polyesters such as polyethylene terephthalate (PET) crystallize slowly when cooled from the melt or heated from below the glass transition temperature. To obtain acceptable manufacturing economics, it is necessary that the rate of thermal crystallization in the mold be rapid. However, at the same time, the crystallization rate upon cooling from the melt must be such that an amorphous film can be prepared.

A well known method of increasing the crystallization rate of polyesters in general is incorporation of a crystallization nucleator into the polyester, typically inorganic or organic solids which are finely dispersed therein. An example of an inorganic nucleator is talc, while an example of an organic nucleator is polyethylene. However, these nucleators are typically used in injection molding processes, where crystallization occurs during cooling from the melt, and rapid crystallization is the desired goal. Such nucleators may also induce rapid crystallization as the polymer is heated from below the $T_g$ as well, and polyethylene, for example, is the dominant nucleator used in roll-feed operations. However, the operability of any given injection molding nucleator in thermoforming processes is unpredictable.

In the second of the thermoforming processes, to which the subject invention is directed, the polyester sheet is extruded directly before thermoforming, and is thermoformed prior to complete vitrification. This process is termed the melt-to-mold process. In contrast to the roll-fed process where the polyester sheet is heated from below its $T_g$, in the melt-to-mold process, the polyester is at or above its $T_g$. Thus, the crystallization process is completely different, and it has been found, in general, that crystallization nucleators eminently suitable for the roll-fed process are ill-suited for the melt-to-mold process. The differences in crystallization due to the thermal history of the polyester is discussed by D. W. van Krevelen, CHIMIA, 32 (1978), p. 279, where large differences in nucleation density are observed with differences in thermal history, i.e. depending upon whether the polymer is heated from below the glass transition temperature or cooled from the melt to the crystallization temperature.

In the melt-to-mold process, typical nucleators such as those employed in injection molding are not effective, as they often induce crystallinity rapidly and at an uncontrolled rate. While such nucleators may be eminently successful for injection molded parts, in the melt-to-mold process, the film should not appreciably crystallize prior to thermoforming. On the other hand, for economical processing, it is necessary that the thermoformed article rapidly but controllably crystallize in the mold. Thus, the requirements of successful nucleators in the melt-to-mold process are very critical.

The selection of crystallization nucleators in thermoforming of crystallizable polyesters is further complicated by the additives generally employed. Such additions typically include fillers, pigments, and most importantly, impact modifiers. In the roll-fed thermoforming process, for example, as disclosed in U.S. application Ser. No. 10/135,628, use of polyolefin nucleating agents together with polyolefin impact modifiers as taught by U.S. Pat. No. 3,960,807, produces negative effects in the crystallization rate of the polyester. Thus, the chosen crystallization nucleator must operate successfully in polyesters containing other ingredients which may affects its performance.

Nucleators which facilitate crystallization and have been used in polyester molding and roll-fed thermoforming processes include poly(tetramethylene terephthalate) polyesters, as disclosed in copending U.S. application Ser. No. 10/135,628; metal salts of polyesters as disclosed by U.S. Pat. No. 5,405,921; combinations of inorganic compounds with polyester compositions having specific end group chemistry as disclosed in U.S. Pat. No. 5,567,758; sodium compounds and wax, as disclosed in U.S. Pat. No. 5,102,943; poly(butylene terephthalate), copolyetheresters, or nylon 6,6, as disclosed in Research Disclosure 30655 (October 1989); polyester elastomers in polyethylenenaphthalate polyesters, as disclosed in U.S. Pat. No. 4,996,269; poly(oxytetramethylene) diol, as disclosed in U.S. Pat. No. 3,663,653; ethylene-based ionomers in block copolyesters as disclosed in U.S. Pat. No. 4,322,335; polyoxyalkylene diols as disclosed in U.S. Pat. No. 4,548,978; alkali metal salts of dimer or trimer acids, as disclosed in U.S. Pat. No. 4,357,268; sodium salts of fatty acids in conjunction with alkyl esters of a $C_{2-8}$ carboxylic acid as disclosed in U.S. Pat. No. 4,327,007; partially neutralized salts of a polymer containing neutralizable groups, as disclosed in U.S. Pat. No. 4,322,335; neutralized or partially neutralized salts of montan wax or montan wax esters as disclosed in U.S. Pat. No. 3,619,266; epoxidized octyloleate together with sodium stearate, as disclosed in U.S. Pat. No. 4,551,485; and amino-terminated polyoxyalkylene polyethers as disclosed in U.S. Pat. No. 5,389,710. However, a nucleating agent which is useful for melt-to-mold thermoforming has neither been disclosed, nor taught or suggested by these references.

Large quantities of polyester, particularly PET, is used in the manufacture of beverage containers. The properties of the polyester employed are considerably different from those of polyester used for thermoforming. The polyester employed for beverage containers is generally required to have high brightness and clarity, and the "p reforms" or "parisons" used to blow mold the beverage containers are injection molded. Because of the brightness and clarity requirements, particulate nucleating agents and impact modifiers are generally absent, since their presence will cause a haze or cloudiness of the product. In such polyesters, a more exacting requirement is a low acetaldehyde content, both as produced and in the parisons molded therefrom. The search for effective polycondensation catalysts which allow for reasonable rates of polycondensation while limiting acetaldehyde generation, identification of catalyst deactivators which minimize acetaldehyde generation during molding, and acetaldehyde "scavengers" which scavenge acetaldehyde or prevents its migration into food products is a subject of considerable on-going development.

For example, phosporic acid has been used as a catalyst deactivator in antimony-catalyzed polycondensation, but must be added carefully to avoid production of precipitants which lower clarity. Titanium catalysts are much more effective polycondensation catalysts, but generally produce a product with higher yellowness, and thus, to date, have been seldom used. In such systems, organophosphorus compounds such as trimethylphosphate, triethylphosphate, and triphenylphosphate have been touted as deativators, added late in the melt-phase polycondensation. In U.S. Pat. No. 4,837,115, addition of high molecular weight polyamides is disclosed as lowering acetaldehyde, while in U.S. Pat. No. 5,258,233, addition of 0.05 to 2.0 weight percent of an aromatic polyamide with a molecular weight below 15,000 g/mol or an aliphatic polyamide with a molecular weight below 7000 g/mol is disclosed. The latter patent also discloses thermoformable polyester sheet (roll-fed process) which employs polyethylene as a crystallization nucleator.

It would be desirable to provide a crystallization nucleator which is effective in melt-to-mold thermoforming of crystallizable polyester. It would be further desirable to provide a crystallization nucleator which allows for tailoring of the rate of crystallization, and which is suitable for use with additives typically employed in polyesters used to prepare thermoformed products by the melt-to-mold process.

SUMMARY OF THE INVENTION

It has now been surprisingly discovered that aliphatic polyamides are highly effective and tailorable crystallization nucleators in crystallizable polyester compositions, and are effective in the presence of conventional additives as well.

DETAILED DESCRIPTION OF THE PREFERRED EMBODIMENT(S)

The polyester material which may be used in the present invention may be any polyester that will crystallize during thermoforming of the food tray although unmodified poly (ethylene terephthalate) is particularly preferred. For example, the crystallizable polyesters also may be selected from poly(propylene terephthalate), poly(tetramethylene terephthalate), poly(methylpentamethylene terephthalate), poly(1,4-cyclohexylenedimethylene terephthalate), poly (ethylene 2,6-naphthalenedicarboxylate), poly(propylene 2,6-naphthalenedicarboxylate), and poly(tetramethylene 2,6-naphthalenedicarboxylate).

The polyester component of the subject invention compositions are commercially available and/or may be prepared by batch or continuous processes using conventional melt phase or solid state condensation procedures well known in the art. Also, the polyester component may be obtained from post consumer waste, e.g., recycled polyester. Polyesters useful in the present invention are preferably comprised of diacid residues comprising at least 90 mole percent terephthalic acid residues or 2,6-naphthalenedicarboxylic acid residues; and diol residues comprising at least 90 mole percent residues derived from an alkylene glycol containing 2 to 6 carbon atoms, or 1,4-cyclohexanedimethanol; wherein the polyester is made up of 100 mole percent diacid residues and 100 mole percent diol residues. Up to 20 mole percent, preferably up to 10 mol percent of the diacid component of the polyesters may derived from diacids other than terephthalic and 2,6-naphthalenedicarboxylic acid residues. For example, up to 10 mole percent of the diacid residues may be residues derived from dicarboxylic acids containing about 4 to about 40 carbon atoms such as succinic, glutaric, adipic, pimelic, suberic, azelic, sebacic, terephthalic, isophthalic, sulfodibenzoic, sulphoisophthalic, maleic, fumaric, 1,4-cyclohexanedicarboxylic (cis-, trans-, or cis/trans mixtures), and the like. The diacid residues may be derived from the dicarboxylic acids, esters and acid chlorides thereof, and, in some cases, anhydrides thereof.

Similarly, up to 20 mole percent, and preferably up to 10 mol percent of the diol residues may be derived from diols other than residues derived from an alkylene glycol containing 2 to 6 carbon atoms or 1,4-cyclohexanedimethanol. Examples of other diols which may be used in the preparation of the polyester component include 1,8-octanediol, 2,2,4,4-tetramethyl-1,3-cyclobutanediol, diethylene glycol and the like. Small amounts, e.g., up to 2 mole percent, of a branching agent such as trimellitic anhydride, pyromellitic dianhydride, glycerol, pentaerythritol, polyvinyl alcohol, styrene-maleic anhydride (SMA) and the like may be included in the polyester, if desired. Normally, the permissible amount of diacid residues other than terephthalic acid residues or 2,6-naphthalenedicarboxylic acid residues plus diol residues other than residues derived from an alkylene glycol containing 2 to 6 carbon atoms, or 1,4-cyclohexanedimethanol will not exceed 10 mole percent of the total of 100 mole percent diacid residues and 100 mole percent diol residues. It is essential that the polyester component be crystallizeable upon being thermoformed. The polyester component should have an inherent viscosity (IV) in the range of about 0.4 to about 1.2 dL/g, preferably about 0.55 to 1.05 dL/g, measured at 23° C. by dissolving 0.50 g of polyester into 100 mL of a solvent consisting of 60 weight percent phenol and 40 weight percent tetrachloroethane. The polyester component of our novel compositions preferably consists essentially of terephthalic acid residues and ethylene glycol residues and has an IV of about 0.55 to 0.95 dL/g.

The crystallization nucleators which are effective in the subject invention are aliphatic polyamides, including but not limited to polybutyleneadipamide, polyhexyleneadipamide, polyoctyleneadipamide, polycaprolactam, polyamide-11, polyamide-12, and other aliphatic polyamides which are conceptually the condensation product of a $C_{4-12}$ alkylenediamine and a $C_{4-12}$ dicarboxylic acid, or of an aminocarboxylic acid or cyclic lactam. While the polyamide may also contain a minor portion of aromatic residues, these should be less than 20 mol percent based on the total amount of all residues present, more preferably less than 10 mol percent, and yet more preferably less than 5 mol percent. Most preferably, aromatic residues are absent.

The amount of the crystallization nucleator is preferably within the range of 0.5 to 15 weight percent, more preferably 1.0 to 12 weight percent, yet more preferably from greater than 2.0 weight percent to 10 weight percent, still more preferably from greater than 2.0 weight percent to 8 weight percent, and most preferably from 2.5 to 6 weight percent. The crystallization nucleator is blended with the crystallizable polyester in the melt phase, preferably in an extruder.

The subject invention crystallization nucleator-containing crystallizable polyesters generally contain other additives as well. These additives may include but are not limited to, fillers, plasticizers, other nucleation enhancers, dyes, pigments, thermal stabilizers, and in particular, impact modifiers.

Any impact modifier useful with crystallizable polyesters may be used, preferably in amounts of from about 1 to about 25 weight percent, more preferably about 2 to about 25 weight percent, and most preferably from about 5 to about 20 weight percent. The impact modifiers are preformed particulates which may be added to the polyester by conventional means, for example in an extruder, either as one or more individual components, or in the form of a master batch. A single impact modifier or a plurality of impact modifiers may be employed.

Preferred impact modifiers are polymers, copolymers, or polymer blends of a polyolefin-based polymer comprised of at least about 30 mole percent ethylene residues, propylene residues or a mixture thereof. Optionally, up to 90% by weight of this impact modifying additive may consist of preformed rubber particles together with a polyolefin-based polymer, copolymer or polymer blend. While this component may be elastomeric, it has been found previously that thermoplastic polymers which are not elastomeric also can improve toughness in such a composition. This impact modifying component may be formed from polymers or copolymers, and/or blends of polymers or copolymers within the framework of the claimed composition.

Branched and straight chain polymers useful as the impact modifier phase of the composition are represented by the formula

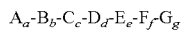

$A_a\text{-}B_b\text{-}C_c\text{-}D_d\text{-}E_e\text{-}F_f\text{-}G_g$ wherein

A represents residues derived from ethylene, propylene or a mixture of ethylene and propylene;

B represents carbon monoxide;

C represents residues derived from an unsaturated monomer selected from $\alpha\beta$-ethylenically unsaturated carboxylic acids having from 3 to 8 carbon atoms and derivatives thereof selected from monoesters of alcohols having 1 to 30 carbon atoms and dicarboxylic acids and anhydrides of dicarboxylic acids and metal salts of monocarboxylic, dicarboxylic and monoesters of dicarboxylic acids having from 0 to 100 percent of the carboxylic acid groups ionized by neutralization with metal ions and dicarboxylic acids and monoesters of dicarboxylic acids neutralized by amine-ended caprolactam oligomers having a degree of polymerization of 6 to 24;

D represents residues derived from an ethylenically unsaturated epoxide containing 4 to 11 carbon atoms;

E represents residues derived from an ethylenically unsaturated monomer selected from acrylate esters having 4 to 22 carbon atoms, vinyl esters of acids having from 1 to 20 carbon atoms, vinyl ethers having 3 to 20 carbon atoms, and vinyl and vinylidene halides, and nitriles having from 3 to 6 carbon atoms;

F represents residues derived from an ethylenically unsaturated having pendant hydrocarbon chains of 2 to 12 carbon atoms capable of being grafted with monomers having at least one reactive group of the type defined in C and D, and pendant aromatic groups which may have 1 to 6 substituent groups having a total of 14 carbon atoms;

G represents residues derived from an ethylenically unsaturated monomer selected from the class consisting of branched, straight chain and cyclic compounds having from 4 to 14 carbon atoms and at least one additional nonconjugated unsaturated carbon-carbon bond capable of being grafted with a monomer having at least one reactive group of the type defined in C and D;

and a=30 to 100 mole percent, b=0 to 30 mole percent, c=0 to 50 mole percent, d=0 to 50 mole percent; wherein units or residues A, B, C, D, E, F and G may be present in any order and the impact modifier polymer contains at least 30 mole percent ethylene residues, propylene residues or a mixture thereof.

Examples of the $\alpha\beta$-ethylenically unsaturated carboxylic acids and alkyl esters of $\alpha\beta$-ethylenically unsaturated carboxylic acids represented by C include acrylic, methacrylic and ethacrylic acids and alkyl esters thereof wherein the alkyl radical contains from 1 to 20 carbon atoms. Examples of ethylenically unsaturated dicarboxylic acids and metal salts of the monocarboxylic, dicarboxylic acids and the monoester of the dicarboxylic acid and neutralized derivatives thereof include, maleic acid, maleic anhydride, maleic acid monoethyl ester, metal salts of acid monoethyl ester, fumaric acid, fumaric acid monoethyl ester, itaconic acid, vinyl benzoic acid, vinyl phthalic acid, metal salts of fumaric acid monoalkyll ester, monoalkyl esters of maleic, fumaric, itaconic acids wherein the alkyl group contains from 1 to 20 carbon atoms. The carboxyl groups of such acids may be neutralized by amine-ended caprolactam oligomers having a degree of polymerization of 6 to 24. Examples of the vinyl ethers, vinyl esters, vinyl and vinylidene halides and ethylenically unsaturated alkylnitriles include vinyl alkyl ethers wherein the alkyl group contains 1 to 20 carbon atoms, vinyl benzoate, vinyl naphthoate, vinyl chloride, vinylidene fluoride, and acrylonitrile. Examples of the unsaturated epoxides having 4 to 11 carbon atoms include glycidyl methacrylate, glycidyl acrylate, allyl glycidyl ether, vinyl glycidyl ether, glycidyl itaconate, 3,4-epoxy-1-butene, and the like. Illustrative examples of monomers from which residues F may be obtained are styrene, isobutylene, vinyl naphthalene, vinyl pyridine, vinyl pyrrolidone, mono-, di-, and tri- chlorostyrene, R'-styrene where R' is 1 to 10 carbon atoms, butene, octene, decene, etc., and the like. Illustrative examples of monomers from which residues G may be obtained include butadiene, hexadiene, norbornadiene, isoprene, divinyl, allyl styrene, and the like.

The impact modifier preferably comprises about 0.5 to 20 weight percent of epoxy-containing residues derived from monomers selected from glycidyl methacrylate, glycidyl acrylate, allyl gycidyl ether, 3,4-epoxy-1-butene, or a mixture of any two or more of such monomers. These epoxy-containing monomers may be introduced into the impact modifier during polymerization, or they may be subsequently grafted onto the impact modifier. Such epoxy-containing, impact modifier polymers are well-known in the art and are available from a plurality of manufacturers.

Impact modifiers that may be modified with a functional epoxy group include, but are not restricted to, polyethylene; polypropylene; polybutene; ethylene based copolymers and terpolymers containing vinyl acetate, alkyl acrylate, alkyl methacrylate where the alkyl group could be methyl, ethyl, butyl or ethylhexyl; ethylene-propylene copolymers (EPR); ethylene-propylene-diene (EPDM); natural rubber; polybutadiene; polyisoprene; acrylonitrile-butadiene (nitrile rubber); styrene-butadiene (SBR); styrene-butadiene-styrene (SBS); styrene-ethylene-butene-styrene (SEBS); acrylonitrile-butadiene-styrene (ABS); methyl methacrylate-butyl acrylate (acrylic core-shell); methyl methacrylate-butadiene-styrene (MBS core-shell); or combinations thereof. Of these materials, those based on polyethylene are preferred.

A preferred group of epoxy-containing impact modifiers include copolymers and terpolymers having the respective general formulas E/Y and E/X/Y wherein:
X represents residues derived from

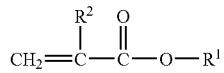

herein $R^1$ s alkyl of up to about 8 carbon atoms, preferably alkyl of 1 to 4 carbon atoms, and $R^2$ is hydrogen, methyl or ethyl, preferably hydrogen or methyl, and X constitutes about 10 to 40 weight percent, preferably 15 to 35 weight percent, and most preferably 20 to 35 weight percent, of terpolymer E/X/Y;

Y represents residues derived from glycidyl methacrylate, glycidyl acrylate, allyl glycidyl ether and 3,4-epoxy-1-butene which constitute about 0.5 to 20 weight percent, preferably about 2 to 10 weight percent, of copolymer E/Y and terpolymer E/X/Y; and E represents ethylene residues that constitute the remainder of the composition.

The impact modifier also may comprise a blend or mixture of copolymers E/Y, E/X or E/X/Y terpolymer, and optionally, a polyethylene or polypropylene polymer.

Of these, copolymers based on ethylene-glycidyl methacrylate (GMA) (E/GMA) containing about 2 to 10 weight percent GMA residues, and terpolymers based on ethylene-methyl acrylate-GMA, ethylene-ethyl acrylate-GMA and ethylene-butyl acrylate-GMA containing about 20 to 35 weight percent alkyl acrylate residues and about 2 to 10 weight percent GMA residues are particularly preferred. The concentration of the epoxy-containing impact modifiers in the compositions of the present invention preferably is about 10 to 25 weight percent, based on the total weight of the composition.

Optionally, up to 90% of the impact modifying component may consist of preformed elastomeric particles such as a core-shell rubber. This core-shell impact modifier may consist of:
(A) a core-shell polymer comprising about 25 to about 95 wt. % of a first elastomeric phase polymerized from a monomer system comprising about 75 to 99.8% by weight $C_1$ to $C_6$ alkyl acrylate, 0.1 to 5% by weight crosslinking monomer, and 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and about 75 to 5 weight percent of a final, rigid thermoplastic phase polymerized in the presence of said elastomeric phase. This final layer may contain chemical species that react with the matrix resin to improve adhesion to the matrix; and
(B) a butadiene based core-shell polymer formed between a butadiene polymer where butadiene units account for at least 50 mole percent of the total polymer and at least one vinyl monomer.

These preformed particles may be of either unimodal or multimodal size distribution. One example of an impact modifier of the core-shell type useful in the present invention is available from Rohm and Haas under the tradename Paraloid™ EXL-5375. Similar preformed rubber particles or mixtures of various types of preformed particles may also be used.

Thermal stabilizers are preferably employed in the thermoformable compositions of the present invention. Such heat stabilizers typically function through the inhibition of oxidation during exposure to an oxidizing atmosphere at high temperatures. Various types of heat stabilizers may be employed with the most useful for the present invention including alkylated substituted phenols, bisphenols, thiobisacrylates, aromatic amines, organic phosphites, and polyphosphites. Specific aromatic amines which demonstrate heat stabilizing capabilities include primary polyamines, diarylamines, bisdiarylamines, alkylated diarylamines, ketone diarylamine condensation products, and aldehyde imines.

One example of a thermal stabilizer useful in the subject invention is Irganox 1010 antioxidant (Ciba-Geigy Corporation) which is believed to be a hindered polyphenol stabilizer comprising tetrakis-[methylene 3-(3,5-di tert-butyl-4-hydroxyphenylpropionate)]methane. Another thermal stabilizer that may be used is 1,3,5-trimethyl-2,4,6-tris (3,5-di-t-butyl-4-hydroxybenzyl)benzene. Yet another example is the PEP-Q additive available from Sandoz Chemical, the primary ingredient of which is believed to be tetrakis-(2,4-di-tert-butyl-phenyl)-4,4' biphenyl phosphonite. Other common stabilizer additives include calcium stearate or zinc stearate. Still other stabilizers commonly used include Ultranox 626 antioxidant (General Electric), the primary ingredient of which is believed to be bis(2,4-di-t-butylphenyl) pentaerythritol diphosphite, and Ultranox 627A antioxidant believed to be Ultranox 626 containing about 7 weight percent of a magnesium aluminum hydrocarbonate. Those persons skilled in the art may easily determine the amount of stabilizer that should be added to improve the thermal stability. This amount typically is about 0.001 to about 5 parts per hundred parts of the polyester component.

When the crystallizable polyester composition is a blend of two or more polyesters, at least one of which is crystallizable, the composition advantageously may contain a transesterification inhibitor to allow the polyesters to maintain their separate identities. Such transesterification-inhibiting additives commonly are employed for blends of polyesters or copolyesters and polycarbonates, such as is described in U.S. Pat. No. 4,088,709. Blend stabilizers differ in their ability to control blend melt stability and transesterification. Effective stabilizers for polyester/polyester as well as polyester/polycarbonate blends are known in the art and are commercially available. Suitable phosphorus-based transesterification inhibitors that may be present in the polyester compositions of the present invention include, but are not limited, to the following phosphorus compounds:

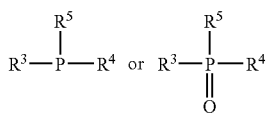

wherein each of $R^3$, $R^4$, and $R^5$ represents a hydrogen atom, an alkyl group containing 1 to 20 carbon atoms, an aryl group containing 6 to 20 carbon atoms, an aralkyl group containing 7 to 20 carbon atoms, or an OR group in which R is a hydrogen atom, an alkyl group containing 1 to 20 carbon atoms, an aryl group containing 6 to 20 carbon atoms, and aralkyl group containing 7 to 20 carbon atoms; $R^3$, $R^4$, and $R^5$ may be different from each other, or at least two of $R^3$, $R^4$, and $R^5$ may be the same, or at least two of $R^3$, $R^4$, and $R^5$ may form a ring, and metal salts of these phosphorous compounds.

Other transesterification inhibitors that may be present include compounds having the structures:

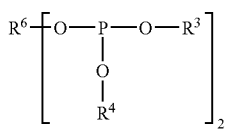

wherein $R^6$ represents a divalent alkyl group having 2-12 carbon atoms or a divalent aryl group having 6-15 carbon atoms; $R^3$ and $R^4$ are monovalent alkyl groups having 2-18 carbon atoms, or a monovalent aryl or substituted aryl group having 6 to 15 carbons;

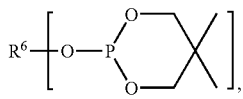

wherein $R^6$ represents a divalent alkyl or poly(alkylene oxide) groups having 2-12 carbon atoms or a divalent aryl or substituted aryl group having 6-15 carbon atoms.

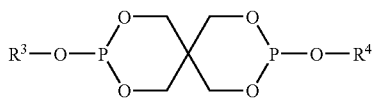

wherein $R^3$ and $R^4$ represent monovalent alkyl groups having 2-18 carbon atoms, or a monovalent aryl or substituted aryl groups having 6-15 carbon atoms.

These phosphorus-containing transesterification inhibitors typically are used in concentrations of about 0.01 to 3 weight percent based on the total weight of the polyester composition. These stabilizers may be used alone or in combination and may be added to either of the component polyesters or to the impact modifier polymer compound before or during the process of forming the polyester compounds of this invention. The suitability of a particular compound for use as a blend stabilizer and the determination of how much is to be used as a blend stabilizer may be readily determined by preparing a mixture of the polyester components and determining the effect on crystallization rate.

The compositions of the present invention may be compounded by methods well known in the art, preferably in single- or twin-screw extruders. The components may be added separately, two or more components may be added in the form of a masterbatch, two or more polymer compositions, masterbatches, etc., may be preblended in the form of pellets, granules, powders, or mixtures thereof prior to entry into the extruder, etc. Following blending in the melt phase, e.g. in on extruder, the thermoformable polyester is extruded into a sheet or film of the desired width and thickness. The width is advantageously maintained at a width suitable for the thermoforming process, i.e. one without excessive waste at the edges of the sheet. The thickness is that desirable for the particular product, typically between 127 and 3175 :m (5 to 125 mils), more preferably between 254 and 2032 :m (10 to 80 mils), and most preferably between about 381 :m and 1016 :m (15 to 40 mils).

The polyester sheet is not allowed to totally vitrify, and thus at least portions, and preferably all the sheet, is kept in the molten state prior to thermoforming. The temperature during thermoforming will be above the Tg of the predominant crystallizable polyester. The temperature, for PET, is preferably in the range of 100° C. to 180° C., more preferably 125° C. to 175° C. It should be noted that the glass transition temperature of homopolymeric PET is about 75-80° C., and the Tgs of modified PET which contains minor amounts of other monomers such as cyclohexanedimethanol (CHDM), isophthalic acid, and naphthalene dicarboxylic acid are similar, while polyethylene naphthalate, having a Tg of about 120-122° C., will necessitate somewhat higher temperatures, since crystallization will only occur between the polymer Tg and the crystalline melt temperature Tm. The Tm's for PET, PEN, PBT, and PBN are about 250° C., 268° C., 223° C., and 242° C., respectively. One skilled in the art can easily adjust the molding temperature and sheet temperature to satisfactory values based on the known or measured Tg and Tm values for any given polymer or polymer blend. In the case of polymer blends, the Tg and Tm of the predominant polymer on a weight/weight basis should be taken as the starting point. Determination of optimal values is routinely established.

The thermoformed product is left in the mold until the desired degree of crystallinity is obtained, generally between 20 and 40%, more preferably between 25 and 35 percent, and most preferably about 30%. The time to reach this target crystallinity may be determined wholly experimentally, or by a combination of measurements and theoretical calculations.

For example, the crystallization of crystallizable PET ("CPET") in a thermoforming process can be modeled using the non-isothermal Avrami model. The isothermal Avrami model for the time-dependent crystallinity level X(t) is $$X(t)=X_\infty(1-\exp(-k(T)\cdot t^n))$$ EQN 1 where k(T) is the isothermal Avrami rate, n is the Avrami coefficient, which is a function of the molecular nature of the crystallizing process, and $X_4$ is the ultimate fractional crystallinity (primary crystallization only). Listed below in Table 1 are isothermal experiment determined crystallization half-times, t½, for CPET with various loadings of subject invention and commercially available crystallization nucleators, as described hereafter.

TABLE 1

|   | 200 | 190 | 180 | 170 | 160 |
|---|---|---|---|---|---|
| 1 | 0.74 | 0.31 | 0.17 | 0.11 | 0.13 |
| 2 | 1.46 | 0.57 | 0.3 | 0.2 | 0.2 |
| 4 | 0.5 | 0.21 | 0.1 | 0.04 | 0.05 |
| Commercial MTM Nuc. | 0.53 | 0.26 | 0.17 | 0.13 | 0.17 |

From these half time measurements and using Eqn. 2, the isothermal Avrami rate constants can be determined (Table 2) using Eqn. 2. (Literature reports have typically found n=3, and this is supported by the raw crystallization growth-rate data.)

$$t_{1/2} = \left(\frac{ln(2)}{k}\right)^{1/n} \quad \text{EQN 2}$$

TABLE 2

| Sample | 200 | 190 | 180 | 170 | 160 |
|---|---|---|---|---|---|
| 1 | 1.710528 | 23.267 | 141.0843 | 520.7717 | 315.4971236 |
| 2 | 0.222724 | 3.742837 | 25.67212 | 86.6434 | 86.64339757 |
| 4 | 5.545177 | 74.84582 | 693.1472 | 10830.42 | 5545.177444 |
| Commercial MTM Nuc. | 4.655838 | 39.43714 | 141.0843 | 315.4971 | 141.084303 |

The crystallization half-times t½ can be determined experimentally by standard methods during cooling of the crystallizable polyester from the melt, for example by DSC. These can then be used to calculate the percent crystallinity as a function of time.

EXAMPLES 1-3 AND COMPARATIVE EXAMPLE 1

Unmodified polyethylene terephthalate having an intrinsic viscosity of 0.95 dL/g is bag blended with various amounts of polyamide 6,6 having a relative viscosity of 50 per ASTM D789, and dried for 16 hours at 100° C. The dry blend is extruded into a 0.025. inch (635 :m) film by means of a Killion 1.5 inch (38 mm) single screw extruder operating at 75 s$^{-1}$, and at a 280° C. (536° F.) melt temperature. The crystallization halftimes of the extruded film is measured by DSC at multiple temperatures. The measured halftime is the time required to reach 50% crystallinity. The crystallization halftimes are summarized in Table 1 reported previously. The calculated percent crystallinities as a function of time at 170° C., a typical melt-to-mold processing temperature, are given in Table 3 below, and compared to values similarly calculated for a commercially available black microwave tray believed to contain activated carbon black as a nucleator.

TABLE 3

| time [s] | Example 1 | Example 2 | Example 3 | Comparative Example C1 |
|---|---|---|---|---|
| % nucleator | 1% | 3% | 5% | — |
| 1 | 0.01 | 0.07 | 1.47 | 0.044 |
| 2 | 0.10 | 0.57 | 9.91 | 0.349 |
| 3 | 0.32 | 1.89 | 22.25 | 1.160 |
| 4 | 0.76 | 4.29 | 28.79 | 2.677 |
| 5 | 1.47 | 7.81 | 29.94 | 5.006 |
| 6 | 2.49 | 12.18 | 30.00 | 8.117 |
| 7 | 3.86 | 16.88 | | 11.822 |
| 8 | 5.57 | 21.27 | | 15.798 |
| 9 | 7.61 | 24.83 | | 19.656 |
| 10 | 9.91 | 27.31 | | 23.037 |
| 11 | 12.41 | 28.79 | | 25.707 |
| 12 | 15.00 | 29.53 | | 27.596 |
| 13 | 17.57 | 29.85 | | 28.788 |
| 14 | 20.02 | 29.96 | | 29.455 |
| 15 | 22.25 | 29.99 | | 29.783 |
| 16 | 24.20 | 30.00 | | 29.924 |
| 17 | 25.82 | | | 29.977 |
| 18 | 27.11 | | | 29.994 |
| 19 | 28.08 | | | 29.999 |
| 20 | 28.79 | | | 30.000 |
| 21 | 29.27 | | | |
| 22 | 29.58 | | | |
| 23 | 29.77 | | | |

As can be seen from the data, the time to reach 30% crystallinity can be readily adjusted when employing the nucleators of the present invention. At about 3 weight percent, the subject invention nucleators are slightly more effective than the commercial nucleator, while at 5% concentration, the subject invention nucleator achieves 30% crystallinity in only 5 to 6 seconds.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a process for the melt-to-mold fabrication of crystallized polyester containers comprising a crystallizable polyester, whereby a molten, crystallizable polyester composition film is thermoformed and crystallized by cooling to a temperature between the polyester Tg and the polyester Tm, the improvement comprising increasing the rate of crystallization by adding to said crystallizable polyester composition prior to forming a film thereof, an amount of an aliphatic polyamide effective to increase the rate of crystallization of said crystallizable polyester.

2. The process of claim 1, wherein said crystallizable polyester is a polyethylene terephthalate polyester containing not more than about 20 mol percent of residues of diols other than ethylene glycol and not more than about 20 mol percent of dicarboxylic acid residues other than those of terephthalate acid.

3. The process of claim 2, wherein said aliphatic polyamide is present in an amount of from about 1.0 weight percent to about 5.0 weight percent based on the total weight of the crystallizable polyester composition.

4. The process of claim 1, wherein said crystallizable polyester is a polyethylene naphthalate polyester containing not more than about 20 mol percent of residues of diols other than ethylene glycol and not more than about 20 mol percent of dicarboxylic acid residues other than those of naphthalene dicarboxylic acid.

5. The process of claim 4, wherein said aliphatic polyamide is present in an amount of from about 1.0 weight percent to about 5.0 weight percent based on the total weight of the crystallizable polyester composition.

6. The process of claim 1, wherein said aliphatic polyamide is present in an amount of from about 0.5 weight percent to about 10 weight percent based on the total weight of the crystallizable polyester composition.

7. The process of claim 6, wherein the aliphatic polyamide comprises less than 20 mol percent aromatic residues.

8. The process of claim 6, wherein the aliphatic polyamide comprises less than 10 mol percent aromatic residues.

9. The process of claim 6, wherein the aliphatic polyamide comprises less than 5 mol percent aromatic residues.

10. The process of claim 6, wherein aromatic residues are absent from the aliphatic polyamide.

11. The process of claim 1, wherein said aliphatic polyamide is present in an amount of from greater than 2 weight percent to about 10 weight percent based on the total weight of the crystallizable polyester composition.

12. The process of claim 1, wherein said aliphatic polyamide is present in an amount of from greater than 2 weight percent to 8 weight percent based on the total weight of the crystallizable polyester composition.

13. The process of claim 1, wherein said aliphatic polyamide is present in an amount of from about 1.0 weight percent to about 5.0 weight percent based on the total weight of the crystallizable polyester composition.

14. The process of claim 1, wherein said crystallizable polyester composition further comprises one or more impact modifiers.

15. The process of claim 1, wherein said crystallizable polyester composition further comprises one or more thermal stabilizers.

16. A melt-to-mold process for fabricating a crystallized polyester container, comprising:
    a. thermoforming a molten crystallizable polyester composition comprising a crystallizable polyester and an aliphatic polyamide to form a container; and
    b. crystallizing the container by cooling the container to a temperature between the polyester Tg and the polyester Tm.

17. The process of claim 16, wherein said crystallizable polyester is a polyethylene terephthalate polyester containing not more than about 20 mol percent of residues of diols other than ethylene glycol and not more than about 20 mol percent of dicarboxylic acid residues other than those of terephthalate acid.

18. The process of claim 16, wherein said aliphatic polyamide is present in an amount of from greater than 2 weight percent to about 10 weight percent based on the total weight of the crystallizable polyester composition.

19. The process of claim 16, wherein said aliphatic polyamide is present in an amount of from 2.5 weight percent to 6 weight percent based on the total weight of the crystallizable polyester composition.

20. The process of claim 16, wherein the aliphatic polyamide comprises less than 20 mol percent aromatic residues.

21. The process of claim 16, wherein the aliphatic polyamide comprises less than 10 mol percent aromatic residues.

22. The process of claim 16, wherein the aliphatic polyamide comprises less than 5 mol percent aromatic residues.

23. The process of claim 16, wherein aromatic residues are absent from the aliphatic polyamide.

24. The process of claim 16, wherein said crystallizable polyester composition further comprises one or more impact modifiers.

25. The process of claim 16, wherein said crystallizable polyester composition further comprises one or more thermal stabilizers.

* * * * *